United States Patent [19]
Seki

[11] 3,867,493
[45] Feb. 18, 1975

[54] PROCESS OF PRODUCING SYNTHETIC WOOD HAVING A BEAUTIFUL APPEARANCE

[75] Inventor: Tatsujiro Seki, Nara, Japan

[73] Assignee: Sekisui Kaseihia Kogyo Kabushiki Kaisha, Nara, Japan

[22] Filed: Nov. 16, 1972

[21] Appl. No.: 307,266

[30] Foreign Application Priority Data
Nov. 16, 1971  Japan.............................. 46-91727

[52] U.S. Cl................ 264/45.9, 161/159, 162/166, 264/47, 264/48, 264/53, 264/177 R, 264/DIG. 14, 425/817 C
[51] Int. Cl............................................ B29d 27/00
[58] Field of Search ....... 264/54, 46, 48, 53, 177 R, 264/DIG. 14, 47; 161/159, 166; 425/817 C

[56] References Cited
UNITED STATES PATENTS
3,720,572   3/1973   Soda et al......................... 264/54 X
FOREIGN PATENTS OR APPLICATIONS
47,104   11/1972   Japan................................. 264/56

Primary Examiner—Philip E. Anderson
Attorney, Agent, or Firm—Sughrue, Rothwell, Mion, Zinn & Macpeak

[57] ABSTRACT

An improved process of producing a synthetic wood having a beautiful appearance which comprises extruding a softened thermoplastic resin containing an expanding agent through the apertures of an extrusion die to form a number of expanded strands, coalescing the strands while they are in the softened state and forming a cellular molding therefrom, wherein a part of each of the apertures arranged at least in one line next to the apertures located at the outermost portion of the die have a cross-sectional area near the discharge side of the die which is 1.1 to 3.6 times broader than the cross-sectional area of the apertures located at the outermost portion of the die, the length of the enlarged portions of the apertures being 10–80% of the length of the aperture, whereby the expansion of the strands extruded through said apertures arranged at least in one line are suppressed. Apparatus comprising such a die.

7 Claims, 10 Drawing Figures

PROCESS OF PRODUCING SYNTHETIC WOOD HAVING A BEAUTIFUL APPEARANCE

BACKGROUND OF THE INVENTION

1. Field of the Invention

The present invention relates to an improved process of producing a synthetic wood by extruding a thermoplastic resin having incorporated therein an expanding through a die of an extruder, said die having a number of apertures to form of a number of foamed strand, coalescing the strands into a body or a bundle, and forming the synthetic wood therefrom.

2. Description of the Prior Art

A method for producing fine-cellular articles has already been proposed. That method comprises extruding an expandable resin containing an expanding agent through a die having a number of apertures to form a corresponding number of strands containing innumerable fine foams, collecting said strands in parallel relationship, and coalescing said strands in a body. This method is described in U.S. Pat. No. 3,121,130 and in Japanese Patent Publication 10518/60. However, it is the object of such known methods to obtain an evenly foamed article by expanding the strands uniformly. It has heretofore never been proposed to form layers of uneven expansion in the finished article. Also, known methods are directed to obtaining a finished article which has been expanded to as high a degree as is possible, therefore, the strands extruded through the apertures of the die have been expanded to the maximum. Furthermore, in order to obtain an uniformly expanded finished article it has been found desirable in the prior art to use a die provided with apertures which have identical shapes and which are located at equal intervals. Therefore, according to known methods fine-cellular articles which include layers of various densities cannot be obtained, and the article obtained cannot resemble natural wood.

The inventor previously proposed, considering the relation between the construction of the die and the capacity of expansion, a process of producing a synthetic wood by freely expanding strands of an expandable resin extruded through the apertures of a die and at the same time restricting the spaces into which the strands can expand to suppress the expansion rates of the strands of resin, or by providing a different density to each of the strands of resin extruded through the apertures (U.S. Pat. No. 3,720,572). That is, by this previously proposed process a difference in density was provided to portions of each of the strands of resin or to each of the strands of resin to form a molded article of the strands having high-density portions and low-density portions alternately present in the longitudinal direction of the article, whereby a structure similar to the annular ring structure of natural wood is provided to the cellular molded article.

SUMMARY OF THE INVENTION

The present invention was achieved on the basis of the following discovery: In order to provide a natural wood-like appearance to a synthetic wood, it is necessary to provide natural wood color tones to the resin. For this purpose, it is necessary to mix in the resin coloring agents such as various dyes or pigments of yellow, brown and, as the case may be, faint black. However, in the case of assembling strands of resin blended with such coloring agents, if the strands of the resin have a substantially different density, the color of the strands of the resin having a low density (high expansion rate) becomes faint, while the color of the strands having a high density (low expansion rate) becomes dark. If such colors appear on the surface of the molded article the appearance of the article is degraded. Thus, it has been found to be desirable that the strands of the resin disposed at the surface of the molded article do not have an extreme difference in density.

Accordingly, the present invention is based on the employment of a means of enlarging the cross-sectional area of the resin discharge portion of the apertures of a die arranged at least in one line next to be apertures located at the outermost portion of the die, to thereby suppress the expansion of the strands of the resin extruded through the apertures.

That is, the present invention is as follows: In a process of producing a cellular molding having a desired cross-section by a die having a number of apertures at the resin discharge end of an extruder, extruding a softened thermoplastic resin containing an expanding agent through the apertures to form a number of expanded strands, coalescing the strands in a body while they are in the softened state, and forming a cellular article therefrom, the method of producing a synthetic wood having a beautiful appearance which comprises enlarging a portion of each of the apertures arranged at least in one line next to the apertures located at the outermost portion of the die, the cross-sectional area of said enlarged portion of the apertures being 1.1 to 3.6 times broader than the cross-sectional area of the apertures located at the outermost portion of the die, said enlarged portion being at the resin discharge side of the apertures, and the length of the enlarged portion of the apertures being 10–80% of the length of the aperture, whereby the expansion of the strands extruded through said apertures arranged at least in one line is suppressed.

BRIEF EXPLANATION OF THE DRAWINGS

FIGS. 1 and 3 are front views of the dies viewed from the resin discharge side and FIGS. 2 and 4 are cross-sectional views of the dies taken along line II—II and IV—IV of FIGS. 1 and 3, respectively.

FIG. 10 is a cross-sectional view of the die along line X—X of FIG. 9.

DESCRIPTION OF THE PREFERRED EMBODIMENTS

Figure 1:
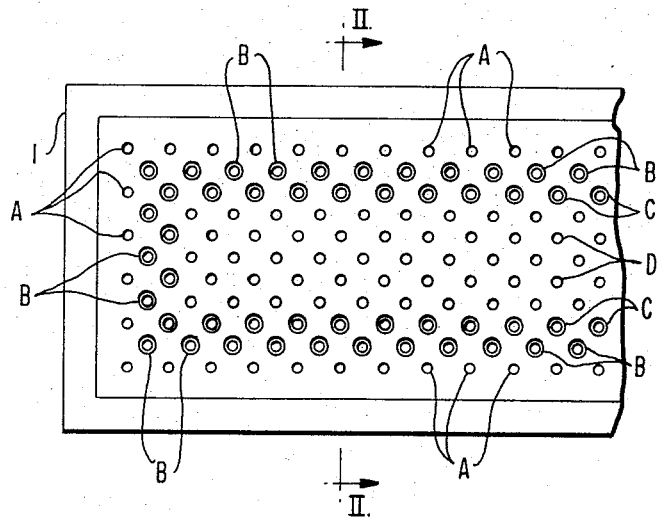
FIG. 1 to FIG. 4 illustrate dies used in this invention, that is.
Figure 2:
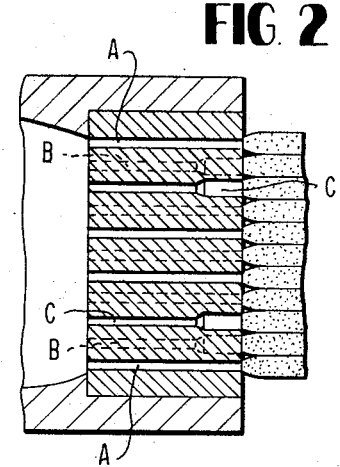

In FIGS. 1 and 2, apertures A, B, C and D are shown in a die 1 and the small holes A are located adjacent to the periphery of the die at the discharge end of an extruder. Apertures B are arranged in one line next to apertures A, and apertures C are arranged in line next to apertures B, i.e., the apertures arranged in the second line from the outmost line of the apertures A. In a conventional die, each of the apertures A, B and C has the same cross sectional area throughout the whole length of the aperture but in the die used in the present invention each of the apertures B or apertures B and C has a portion having an increased cross-sectional area at the resin discharge side. The cross sectional area of the enlarged portion of the apertures is 1.1–3.6 times broader than the cross sectional area of the aperture A and the length of the elongated portion of the aperture B or C is 10–80% of the total length or depth of the aperture B or C. The cross sectional area of the other apertures D may be same as that of the aperture A or may be larger or smaller than that of the aperture A. There is no specific limitation with respect to the exact positioning of apertures A, B and C, i.e., there is no critical interval between the individual apertures. However, generally apertures A and B are present at the same interval, and apertures D are optionally arranged in any desired manner.

A die having such a construction is employed in the process of this invention.

The total length or depth the of apertures used in the present invention is generally identical with the width of the front plate of die, i.e., generally from about 5 to about 35 mm, preferably from 10 to 20 mm.

Where the length or depth is less than about 5 mm, there is the possibility the apertures will be deformed by the pressure of the resin extruded, and where it is more than 35 mm, the resistance to the passage of resin becomes large and the amount of resin extruded is descreased.

Generally, the diameter of apertures is from about 0.5 mm to about 3 mm. Where it is less than 0.5 mm, the amount of resin extruded decrease, and when it is greater than 3.0 mm the strands become thicker and a product having a natural wood appearance cannot easily be obtained.

It will be apparent to one skilled in the art that the above ranges are not absolute bounds an the present invention but represent parameters which will generally be used in normal commercial practice, and this is especially true for the total length or depth of the apertures. Similarly, it will be apparent that the diameter of the apertures can vary, but to obtain the most beautiful and natural appearance the above ranges should be observed.

From the above explanation, the function of the apertures A located at the outermost portion of the die at the discharge end of the extruder may be understood, but by way of precaution, this function will be explained below for various dies.

Figure 3:
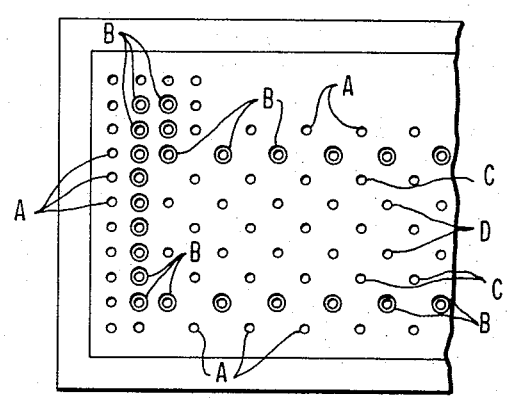
Figure 4:
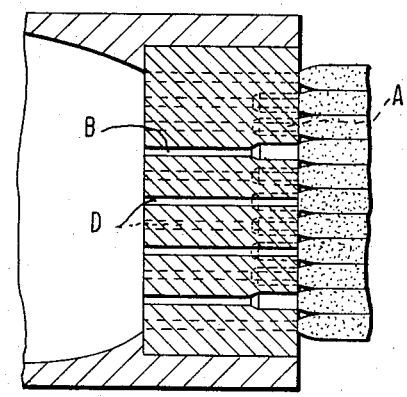

The die shown in FIGS. 3 and 4 is for forming a molded article having a locally depressed central portion, and in this die the apertures A are located at the outermost portion of the die or are the apertures closest to the periphery of the die. Thus, the apertures B are the apertures arranged in the first line next to the apertures A and further the apertures C are apertures arranged in the second line next to the apertures B. In the die of this invention, the cross sectional area of the discharge side of each of the apertures B or apertures B and C is enlarged.

Figure 5:
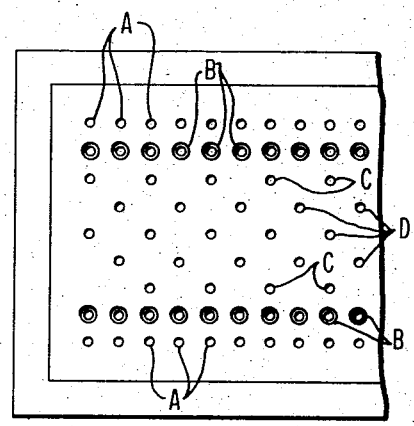
FIG. 5 is a front view of the die used in the Example 1.
Figure 6:
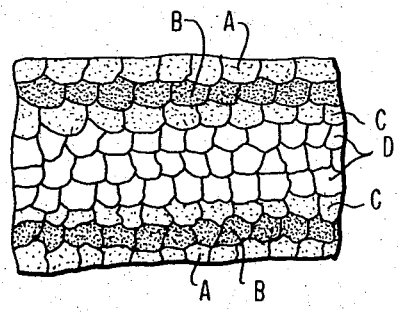
FIG. 6 is a cross-sectional view of the molding obtained by using the die shown in FIG. 5.

FIG. 5 shows the die used in Example 1. In this die, only apertures B, which are arranged in the first line next to the apertures A located at the outermost portion of the die, are enlarged at the resin discharge side, and the apertures C are not enlarged. Further, the distribution of the apertures A and B and that of the apertures C and D are different from each other. In these aspects, the die of FIG. 5 is different from the dies of FIGS. 1 and 2. Using the die of FIG. 5, the molding whose cross-sectional view is shown in FIG. 6 is obtained.

Figure 7:
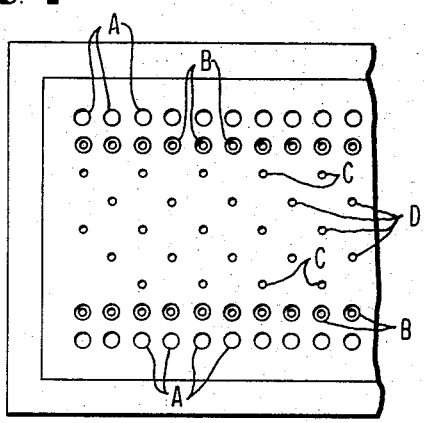
FIG. 7 is a front view of the die used in Example 2.
Figure 8:
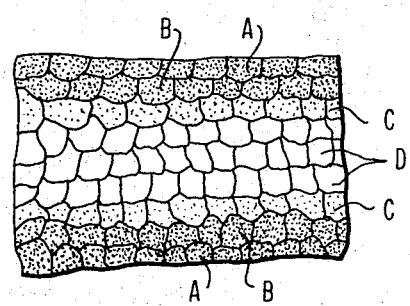
FIG. 8 is a cross-sectional view of the molding obtained using the die shown in FIG. 7.

The die used in Example 2 is shown FIG. 7. In this die, the apertures A located at the outermost portion of the die are enlarged to 1.1–1.7 times the cross-sectional area of the apertures C and D located at the central portion of the die. Using the die of FIG. 7, the molding whose cross-sectional view is shown in FIG. 8 is obtained.

Figure 9:
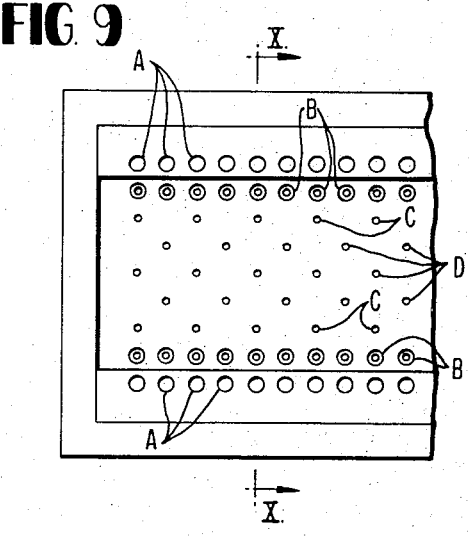
FIGS. 9 and 10 illustrate the dies used in Example 3. That is, of FIG. 9 is a front view of the die viewed from the resin discharge side
Figure 10:
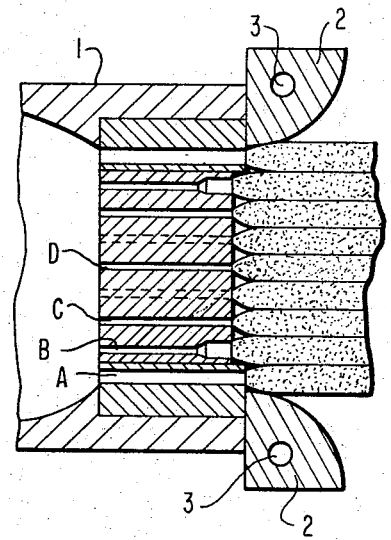

In FIGS. 9 and 10, the die used in Example 3 is shown. This die is a modification of the die of FIG. 7 wherein the peripheral wall of each of the apertures A located at the outermost part of the die is projected 1.5–5.0 mm. In FIG. 10, 2 is a cooling means and 3 is a duct for cooling water which is passed through the cooling means 2. This cooling means 2 is set to contact the extruded strands at the outmost portion, to thereby cool and press the same.

When the molded article to be formed is a plank having a large width as compared with thickness, no problems arise regarding the surfaces in the direction of thickness, and thus the apertures of the A type may be located at only the outermost side in the direction of width.

When an expandable resin is extruded through the above mentioned die a molded article or molding is formed by the following mechanism: First, the expandable resin extruded through the apertures A located at the outermost portion of the die is expanded freely, simultaneously with extrusion, to form strands of the expanded resin. However, because these strands are disposed at the outermost side of the strand assembly, they are cooled by air and the expansion rate thereof is restricted. Consequently, the density of the outermost strand members is comparatively high. On the other hand, because the resin extruded through the apertures B or C which are located at deeper portions than the apertures A is less brought into contact with air, the density thereof is apt to become comparatively low. Thus, if apertures B or C have the same cross sectional area as that of the apertures A or are located at the same distribution as that of the apertures A, the strands of resin are highly expanded as compared with the stands extruded through the apertures A. Accordingly, in the case of employing a colored resin, the color of the strands of the resin extruded through the apertures B or C of the aforesaid conventional die becomes fainter than the strands extruded through the apertures A. As a result, the strands extruded through the small holes B or C tend to be exposed to the surface of the molded article and thus they appear as faint stripes and degrade the appearance of the molded article.

On the other hand, in the die used in the present invention only the apertures B or apertures B and C have an enlarged portion and thus the expansion of the strands of resin formed through these apertures is restricted, which results in increasing the density of the resin. Although the mechanism of the present invention is not entirely clear, the use of an improved die as above eliminates, in fact, the occurence of the faint stripes on the surface and thus the appearance of the molded article is not degraded.

The following is one possible theory regarding the mechanism of the present invention. The inventors do not, however, wish to be bound by the following theory.

Taking one strand, for instance, the strand is surrounded with other strands, whereby the foamable space is limited. On the contrary, where an enlarged portion is provided, the amount of resin extruded from the aperture becomes larger, while the foamable space is constant. As a result, the foaming rate is reduced and the density becomes higher.

When an enlarged portion is provided at the discharge end, the resin slightly foams in the enlarged portion. The strand thus slightly foamed causes friction with the wall surface of the enlarged portion, the foam of the surface breaks, and thereby the resin will is merely slightly foamed even through extruded in atmospheric free space.

In the present invention, as the final product is a synthetic wood, the product is always colored. The colors of the strands are light in high foaming (low density) areas and dark in low foaming (high density) are as, and from the degree of coloring the foaming rate can be approximately determined.

In the die shown in FIG. 7, the cross sectional area of the apertures A located at the outermost portion of the die is enlarged throughout or from one end of the aperture to the other end thereof as compared with that of the original aperture (that is, the non-enlarged part of the apertures B as well as the apertures C or D), and thus the amount of resin which passes through the apertures A is increased and the strands of resin formed therethrough contain an increases amount of resin. Furthermore, since the strands of resin formed through the apertures A are located at the outermost portion of the strands assembly, they are spontaneously located by being exposed to the air, and may also easily be cooled by means of any exterior cooling. Therefore, the strands of resin formed through apertures A never are of low density. Thus, in the outermost portion of the strands, extremely high density resin strands are formed and, as a result, a surface resin layer having a high hardness is formed. In the die used according to the present invention, since the apertures B arranged in the portion next to the above mentioned apertures A or the apertures B and C are partially enlarged (as explained above), the amount of resin passing through these apertures is increased secondly to that of the apertures A, and thus the expansion of the resin is suppressed and the density is not decreased thereby. As a result, the appearance of any faint stripes on the surface of the formed product may, in fact, be eliminated, and thus the appearance of the molded product is not degraded, which is the same advantage obtained with the dies of FIGS. 1 through 6.

In the die shown in FIGS. 9 and 10, since the peripheral wall of each of the apertures A is projected as compared with the other apertures, the expansion of the strands of resin extruded through the apertures A is retarded, and thus the strands extruded through the apertures A are contacted with the strands extruded through the other apertures B, C and D after the latter have almost been expanded. As a result, the appearance of any faint stripes on the surface of the molded article resulting from the exposure of the strands of resin extruded through the apertures B and C which degrades the appearance of the surface of the molded article is entirely eliminated.

In the process of this invention, a hard thermoplastic resin in expanded and a number of expanded strands are coalesced together in a body. Therefore, each strand cannot freely be expanded to the maximum extent by free expansion and is welded to the adjacent strands before it is expanded to the limit. Consequently, the outer shell of the strand assembly is in a comparatively high density state. Furthermore, because the purpose of the process of this invention is to provide a woodlike molding, there is a certain limit on the density, and it is restricted, on an average, to be less than 0.1 g/cc. Thus, the molding obtained by the process of this invention has low density portions and high density portions disposed therein in the longitudinal direction and has, as a whole, an annular ring structure similar to natural wood.

In the process of this invention only the relationship between the strands located at the outermost portion of the molding and the strands located in the first or first and second lines next to the outermost strands has been described in great detail. However, the other inside strands may be more highly expanded strands or less expanded strands as occasion demands. In such a manner, low density portions and high density portions disposed in the longitudinal direction of the molding are formed in other portions of the molding than the aforementioned portions, whereby an appearance similar to the annular ring structure of natural wood can be realized even more vividly.

The process of this invention will now be expalined in more detail by referring to the following Examples.

EXAMPLE 1

This example was conducted to obtain a board having a thickness of 20 mm. and a width of 600 mm. The die shown in FIG. 5 was used. The structure of the die was as follows:

The front plate of the die was a rectangular plate having a thickness of 20 mm. and having formed therein a number of apertures. Among the apertures, apertures A located at the outermost portion or most adjacent the periphery of the plate had a diameter of 1.6 mm. They were arranged in line over a width of 600 mm. with a distance between the centers thereof of 2.5 mm. The apertures B in the first line located next to the outermost apertures also had a diameter of 1.6 mm. The apertures B were disposed adjacent to the apertures A with a distance between the centers thereof of 2.5 mm. over a width of 600 mm. Furthermore, the apertures C were disposed in the second line apart from the line of the apertures B with a distance between the centers thereof of 5.0 mm. The apertures C were arranged over a width of 600 mm. with a distance between the centers thereof of 5.0 mm.

The diameters of the apertures B and the apertures C were 1.6 mm., as the diameter of the apertures A, but each of the apertures B was enlarged to 2.0 mm. in diameter at the resin discharge side thereof to a depth of 10 mm., i.e., half of the thickness of the front plate of the die. Also, the apertures D were disposed in the inside portion of the plate so that they were each positioned between the two adjacent apertures C a suitable distance therefrom. Thus, the apertures A, B, C and D were distributed over the height (the thickness direction of the molding to be formed) of 20 mm. in the front plate of the die attached to the discharge end of the extruder.

Polystyrene was used as the resin and butane was employed as the expanding agent. The raw material used in this experiment was prepared by mixing 68 kg. of polystyrene particles containing 6% butane and 120 kg. of polystyrene containing no expanding agent and further adding to the mixture 2.8 kg. of fine-powder talc having a size of 10–30 microns. For coloring the mixture a teak-like color, 0.75 kg. of powdered coloring agents were added to the mixture followed by mixing. The mixture was extruded according to the present invention.

The extruder used in this Example had a diameter of 90 mm. and L/D ratio of 30, and the aforesaid raw material was supplied to the extruder. The temperature of the extruder was 145°C at the feed zone thereof, 185°C at the melting zone and 150°C. at the front plate of the die. The raw material was extruded through the die at a rate of 58 kg. per hour, the extruding compression at the discharge end being 250 kg./cm².

The expandable resin was extruded through the die into strands and they were at once freely expanded. The expanded resin strands were introduced into a mold frame of 20 mm. × 600 mm., whereby they welded to each other to provide a board-shaped molding having a thickness of 20 mm., a width of 600 mm., and a mean density of 0.25 g/cc (expansion rate of 4.2 times).

In both surfaces of the board thus prepared the strands were well welded and the strands of the surface were colored to the same extent, and did not show any remarkable uneven shades of color. Thus, an article having a good appearance was obtained. The cross section of the molded article thus obtained is shown in FIG. 6, which shows that the slender members extruded through the small holes B had a high density (low expansion rate) and were not exposed to the surface of the molding.

EXAMPLE 2

This Example was conducted to obtain a board having a thickness of 20 mm. and a width of 600 mm., similar to Example 1. The die shown in FIG. 7 was used. The structure of the die was as follows:

The front plate of the die was a rectangular plate having a thickness of 20 mm. and having formed therein a number of apertures. Among the apertures, apertures A located at the outermost portion or adjacent the periphery of the plate had a diameter of 1.9 mm. They were arranged in line over a width of 600 mm. with a distance between the centers thereof of 2.5 mm. The apertures had a diamter of 1.6 mm. The apertures B were disposed adjacent to the apertures A with a distance between the centers thereof of 2.5 mm. over a width of 600 mm. Furthermore, the apertures C were disposed in the second line apart from the line of the apertures B with a distance between the centers thereof of 5.0 mm. The aperture C were arranged over a width of 600 mm. with a distance between the centers thereof of 5.0 mm.

The diameters of the apertures B and the apertures C were 1.6 mm., but each of the apertures B was enlarged to 2.1 mm. in diameter at the resin discharge side thereof to a depth of 10 mm., i.e., half of the thickness of the front plate of the die. Also, the apertures D were disposed in the inside portion of the plate so that they were positioned between two adjacent apertures C a suitable distance therefrom. Thus, the apertures A, B, C and D were distributed over the height (the thickness direction of the molding to be formed) of 20 mm. in the front plate of the die attached to the discharge end of the extruder.

The resin, expanding agent and coloring agent were the same as those used in Example 1. The extruder and the extruding conditions were the same as those in Example 1. The resin containing the expanding agent and the coloring agent was extruded through the die as described above.

The expandable resin was extruded through the aperture of the die in the form of a number of strands and the thus extruded resin strands were forcibly cooled by means of cooling means equipped at the resin discharge end of the die via an adiabatic material. The cooling means is shown in FIG. 10 (wherein 2 is the same as heretofore defined) and 3 is a duct through which a cooling oil at the temperature of 55° C was recirculated. By means of the cooling means the resin strands at the outermost portion were cooled and simultaneously pressed. The expanded resin strands were introduced into a molding frame of 20 mm. × 600 mm. while softened, whereby the strands were welded together to form a board-shaped molding having a thickness of 20 mm., a width of 600 mm. and a mean density of 0.25 g/cc.

At both surfaces of the board thus prepared, the resin strands were well welded, and in the surface thereof a high density resin layer was noted. Further, in the surfaces thereof each strand was uniformly colored and no remarkable uneven color shade was noticed. Thus, a board having a good appearance was obtained. The thus prepared board had a surface hardness of 35–40 by a Type-D Durometer according to ASTM D2240-64T. In addition, the surface hardness of the board obtained in the preceding Example 1 was 20–35. The cross section of the molded board thus obtained is shown in FIG. 8, which shows that the resin strands extruded through the apertures A and B were of high density.

EXAMPLE 3

Example 3, was conducted to obtain a board having a thickness of 20 mm. and a width of 600 mm., analogous to those of Examples 1 and 2. The die shown in FIGS. 9 and 10 was used. The structure of the die is as follows:

The front plate of the die was a rectangular plate having a thickness of 20 mm. and having formed therein a number of apertures. Among the apertures, apertures A located at the outermost portion or adjacent the periphery of the plate had a diameter of 1.8 mm. They were arranged in line over a width of 600 mm. with a distance between the centers thereof of 2.5 mm. The peripheral wall of each of the apertures A projected by about 2 mm. over that each of apertures B, C and D. Apertures B in the first line located next to the outermost apertures had a diameter of 1.6 mm. Apertures B were disposed adjacent to apertures A with a distance between the centers thereof of 2.5 mm. over a width of 600 mm. Furthermore, apertures C were disposed in a second line apart from the line of apertures B with a distance between the centers thereof of 5.0 mm. Apertures C were arranged over a width of 600 mm. with a distance between the centers thereof of 5.0 mm.

The diameters of apertures B and apertures C were 1.6 mm., but each of apertures B was enlarged to 2.0 mm. in diameter at the resin discharge side thereof to a depth of 10 mm., i.e., half of the thickness of the front plate of the die. Also, the apertures D were disposed in the inside portion of the plate so that they were each positioned between two adjacent apertures C at a suitable distance the therefrom. Thus, apertures A, B, C and D were distributed over the height (the thickness direction of the molding to be formed) of 20 mm. in the front plate of the die attached to the discharge end of the extruder.

Polystyrene was used as the resin and butane was employed as the expanding agent. The raw material used in this experiment was prepared by mixing 80 kg. of polystyrene particles containing 6% butane and 150 kg. of polystyrene containing no expanding agent, and 3.75 kg. of fine-powder talc having an average size of about 20 microns was further added to the mixture. To color the mixture a teak-like color, 0.92 kg. of powdered coloring agents were added to the mixture followed by mixing. The mixture was extruded according to the present invention.

The extruder used in this Example had a diameter of 115 mm. and L/D ratio of 30 and the aforesaid raw material was supplied to the extruder. The temperature of the extruder was 140° C. at the feed zone thereof, 185° C. at the melting zone and 150° C, at the front plate of the die. The raw material was extruded through the die at a rate of 72 kg. per hour, the extrusion compression at the discharge end being 360 kg/cm$^2$.

The expandable resin was extruded through the die into strands and the thus extruded resin strands in the outer peripheral portion were forcibly cooled by means of the cooling means equipped at the resin discharge end of the die. The cooling means had the structure as shown in FIG. 10 (wherein 2 is the same as heretofore defined) which was attached to the die via an adiabatic material, and 3 is a duct through which a cooling oil at a temperatures of 55° C was circulated. The respective resin strands began to expand at the same time when they were extruded through the die. The thus expanded resin strands were introduced into a molding frame of 20 mm. × 600 mm. where the strands were welded together to form a board-shaped molding having a thickness of 20 mm., a width of 600 mm. and a means density of 0.25 g/cc.

At both surface of the board thus obtained, the resin strands were well welded, and in the surface thereof a high density resin layer was noted. Further, in the surfaces thereof each strand was uniformly colored and no uneven color shade was noticed. Thus, a board having a good appearance was obtained. The thus prepared board had a surface hardness of 41–45 by a Type-D Durometer according to ASTM D2240-64T. According to Example 1, the surface hardness of the board product obtained therein was 20–35. Thus, it can be seen that the surface hardness of the board product obtained in Example 3 was improved over that of Example 1.

EXAMPLE 4

Example 4 was conducted to obtain a board having a thickness of 20 mm. and a width of 150 mm. The die shown in FIGS. 9 and 10 was used. The structure of the die is as follows:

The front plate of the die was a rectangular plate having a thickness of 10 mm. and having formed therein a number of apertures. Among the apertures, apertures A located at the outermost portion or adjacent the periphery of the plate had a diameter of 1.8 mm. They were arranged in line over a width of 150 mm. with a distance between the centers thereof of 2.0 mm. The peripheral wall of each of the apertures A projected by about 1.5 mm. over that of each of the apertures B, C and D. Apertures B in the first line located next to the outermost apertures had a diameter of 1.6 mm. Apertures B were disposed adjacent apertures A with a distance between the centers thereof of 2.0 mm. over a width of 150 mm. Furthermore, apertures C were disposed in the second line from the line of apertures B with a distance between the centers thereof of 4.0 mm. Apertures C were arranged over a width of 150 mm. with a distance between the centers thereof of 4.0 mm.

The diameters of apertures B and apertures C were 1.6 mm., but each aperture B was enlarged to 2.0 mm. in diameter at the resin discharge side thereof to a depth of 5 mm., i.e., half of the thickness of the front plate of the die. The apertures D were disposed in the inside portion of the plate so that they were each positioned between two adjacent apertures C at a suitable distance therefrom. Thus, apertures A, B, C and D were distributed over the height (the thickness direction of the molding to be formed) of 20 mm. in the front plate of the die attached to the discharge end of the extruder.

Polymethylmethacrylate was used as the resin and butane was employed as the expanding agent. The raw material used in this experiment was prepared by mixing 64 kg. of polymethylmethacrylate particles containing 65 butane and 166 kg. of polymethylmethacrylate containing no expanding agent and further adding to the mixture 3.75 kg. of fine powdered talc having an average size of about 20 microns. To color the mixture a teak-like color, 0.92 kg. of powdered coloring agents were added to the mixture followed by mixing. The mixture was extruded according to the present invention.

The extruder used in this Example had a diameter of 50 mm. and L/D ratio of 25 and the aforesaid raw material was supplied to the extruder. The temperature of the extruder was 180° C. at the feed zone thereof, 240° C. at the melting zone, and 220° C. at the front plate of the die. The raw material was extruded through the die at a rate of 15 kg. per hour, the extrusion compression at the discharge end being 250 kg/cm$^2$.

The expandable resin was extruded through the die into strands and the thus extruded resin strands in the outer peripheral portion were forcibly cooled by means of the cooling means equipped at the discharge end for resin of the die. The cooling means has a structure as shown in FIG. 10 (wherein 2 is the same as heretofore defined and was attached to the die via an adiabatic material) and 3 is a duct through which a cooling oil at a temperature of 55° C. was circulated. The respective resin strands began to expand at the same time when they were extruded through the die. The thus expanded resin strands were introduced into a molding frame of 20 mm. × 150 mm. where the strands were welded together to form a board-shaped molding having a thickness of 20 mm., a width of 150 mm. and a mean density of 0.25 g/cc.

At both surface of the board thus obtained the resin strands were welded together, and in the surface thereof a high density resin layer was noted.

It will be apparent to one skilled in the art that in addition to the thermoplastic resins specifically utilized in the above examples a great number of thermoplastic resins cmmonly extrudable in this area of the art may be successfully used in the present invention. For instance, in addition to polystyrene and polymethylmethacrylate used in the above examples, other materials such as styrene copolymers, methylmethacrylate copolymers and the like may be used with success. Since other useful materials will be apparent to one skilled in the art, no need exists to recite them in detail at this point.

Further, any of the various foaming or expanding agents as have been used by the prior art in similar processes may be used in the present invention, for instance, gaseous or volatile foamable aliphatic hydrocarbons (butane, pentane), halogenated aliphatic hydrocarbons (Freon 11 and 12), and the like can be used. In some cases, thermally decomposable foaming or expanding agents such as the azodicarboxylic acid amides, dinitrosopentamethylene tetramines and the like can be employed.

While the invention has been described in detail and with reference to specific embodiments thereof, it will be apparent to one skilled in the art that various changes and modifications can be made without departing from the spirit and scope thereof.

What is claimed is:

1. In a process of producing a cellular synthetic wood molding having a desired cross-section by extruding a softened thermoplastic resin containing an expanding agent through the apertures of a die to form a number of expanded strands, coalescing the strands into a formed body while they are in the softened state, and forming a cellular molding therefrom, the improvement which comprises providing the apertures located at the outermost portions of the die among plural apertures formed on the said die with uniform cross-sectional areas over their whole lengths, enlarging a part of each of the apertures arranged in one line or two lines next to the apertures located at the outermost portion of the die, the cross-sectional area of said enlarged portion of the aperture being 1.1 to 3.6 times broader than the cross-sectional area of the apertures located at the outermost portion of the die, said enlarged portions being at the resin discharge side of the apertures and the length of the enlarged portions of the apertures being 10–80% of the length of the apertures, said die containing additional apertures located more inwardly than the apertures located in said first or second line next to the said apertures located at the outermost portion of the die, with all of said additional apertures having cross-sectional areas uniform throughout the whole lengths thereof, whereby the expansion of the strands extruded through said apertures arranged in said one or two lines is suppressed.

2. The method of producing a synthetic wood as claimed in claim 1, wherein the peripheral wall of each of the apertures located at the outermost portion is projected in the direction of the resin discharge by 1.5–5 mm. over that of the other apertures.

3. The method of producing a synthetic wood as claimed in claim 2, wherein the cross sectional area of the apertures located at the outermost portion of the die are enlarged throughout the whole length thereof, the cross-sectional area of said enlarged portion being 1.1 to 1.7 times broader than that of the original apertures.

4. The method of producing synthetic wood as claimed in claim 1 wherein the next two lines of apertures immediately interior the apertures located at the outermost portion of the die have the enlarged cross sectional area portion.

5. The method of producing synthetic wood as claimed in claim 1 wherein the total depth of the apertures is from about 5 to about 35 mm.

6. The method of producing synthetic wood as claimed in claim 1 wherein the diameter of the apertures is in the range of from about 0.5 to about 3 mm.

7. The process of claim 1 wherein the cross-sectional area of the apertures located at the outermost portion of the die are about identical in size to the non-enlarged portions of the apertures in said first or second lines.

* * * * *